United States Patent Office 3,539,580
Patented Nov. 10, 1970

3,539,580
4-ARYL-4-AMINOALKOXY-PIPERIDINES
Hubert Karel Frans Hermans, Beerse, near Turnhout, Hugo Louis Elisabeth Verhoeven, Vosselaar, near Turnhout, Belgium, assignors to Janssen Pharmaceutica, a corporation of Belgium
No Drawing. Filed June 26, 1967, Ser. No. 649,041
Int. Cl. C07d 29/28
U.S. Cl. 260—293.4      7 Claims

ABSTRACT OF THE DISCLOSURE

The compounds are of the class of 1-substituted 4-aryl-4-amino-alkoxy-piperidines and salts thereof having useful anesthetic activity.

The invention relates to novel piperidine derivatives and, more particularly, to 1-substituted 4-aryl-4-aminoalkoxy-piperidines having the formula:

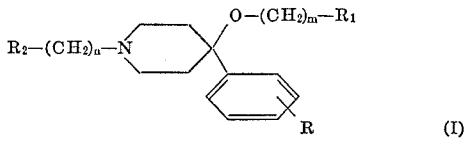

(I)

in which $n$ is an integer from 1 to 3; $m$ is an integer from 2 to 3; R is a member selected from the group consisting of hydrogen, lower alkyl, preferably methyl, halo, preferably chloro, and trifluoromethyl; $R_1$ is a member selected from the group consisting of di-(lower alkyl)-amino,

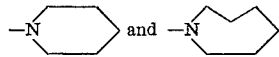

and $R_2$ is a member selected from the group consisting of Z, Z—NH— and Z—NH—CO— wherein Z is a member selected from the group consisting of phenyl, monosubstituted phenyl and di-substituted phenyl, the substituent of such substituted phenyl being a member selected from the group consisting of lower alkyl and halo; provided that, when said $R_2$ is Z—NH—, the integer $n$ equals 2 or 3. The therapeutically active acid addition salts of the foregoing compounds are also embraced within the scope of this invention.

The compounds of Formula I are obtained by reacting a 4-aryl-4-aminoalkoxy-piperidine of the formula:

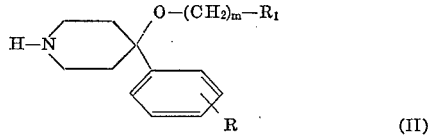

(II)

wherein $m$, R and $R_1$ are as defined heretofore, with a compound of the formula:

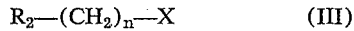   (III)

wherein $n$ and $R_2$ are as defined heretofore and X is halo, preferably chloro or bromo, in an appropriate organic solvent under, preferably, reflux conditions. When $R_2$ is Z—NH—, the respective compound of Formula III may be used in the form of an acid addition salt. Suitable solvents include ketones, such as, for example, acetone and 4-methyl-2-pentanone; aromatic and aliphatic hydrocarbons, such as, for example, benzene, toluene, xylene, hep- tane and the like; and ethers, such as, for example, tetrahydrofuran, dioxane and diethylether.

An alternative method of preparing the subject compounds of Formula I–b with $R_2$ equal to Z—NH— and with $n$ equal to 2 or 3 is by reduction of the amido carbonyl in those compounds or Formula I–a wherein $R_2$ is Z—NH—CO— and, respectively, $n$ is 1 or 2. Reduction of the amido carbonyl is preferably accomplished with a di-light metal hydride as the reducing agent, for example, lithium aluminum hydride, in an organic solvent, such as tetrahydrofuran, dimethoxy ethane, dioxane and the like. Elevated temperatures may be advantageously employed to enhance solubilization and the rate of reaction.

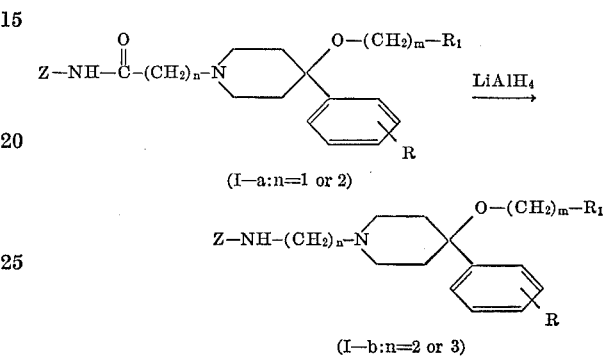

The resulting compounds of Formula I may be converted to their therapeutically acceptable acid addition salts by reaction with an appropriate inorganic acid, such as, hydrohalic acid, e.g., hydrochloric, hydrobromic or hydroiodic acid, sulfuric acid, nitric acid, and the like; or with an appropriate organic acid, such as, for example, acetic, propionic, glycolic, lactic, oxalic, malonic, tartaric, citric, methanesulfonic, N-cyclohexylsulfamic, salicylic and the like acids.

The starting compounds of Formula II may be prepared by reacting an appropriate 1-(ethoxy-carbonyl)-4 - hydroxy-4-arylpiperidine of Formula IV with an appropriate aminoalkylhalide of Formula V, and the thus-obtained compound of Formula VI is then treated with alkali, e.g., potassium or sodium hydroxide, in an alcohol such as ethanol, 2-propanol and the like, to yield the desired compound of Formula II. Preferably, the piperidine IV is first treated with a strongly basic non-hydroxylic agent such as an alkali metal amide or hydride, e.g., sodamide, lithium amide, sodium hydride, lithium hydride and the like, to form the corresponding alkali-metal salt of IV, and then intimately contacting said salt with the aminoalkylhalide V. Suitable solvents for this reaction include the aromatic hydrocarbons, e.g., benzene, toluene, xylene and the like, the dialkylformamides, e.g., dimethylformamide and diethylformamide, and ethers such as tetrahydrofuran, 1,2-dimethoxyethane and the like. Elevated temperatures may be advantageously employed to accelerate the rate of reaction. The reactions may be illustrated by the following schematic diagram wherein Ar represents the

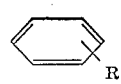

substituent, an $m$, $R$, $R_1$ and $X$ are as previously defined:

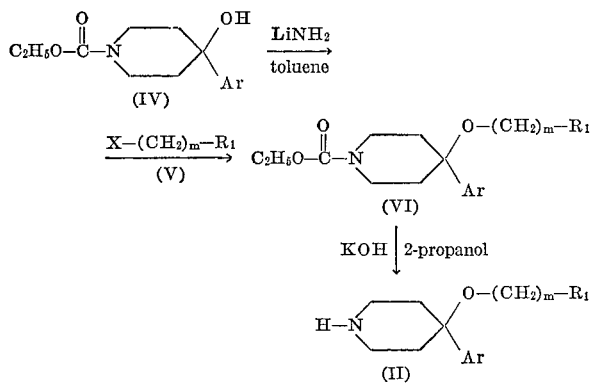

The compounds of Formula V are known in the literature. The compounds of Formula IV may be prepared by reacting 1-(ethoxy-carbonyl)-4-oxo-piperidine VII with an appropriate Grignard reagent, i.e., X—Mg—Ar, wherein Ar is as previously defined and X is halo, preferably chloro or bromo, according to conventional Grignard procedures. The Grignard reagent is readily obtained in the usual manner from the interaction of magnesium and an appropriate phenyl halide, i.e., X—Ar.

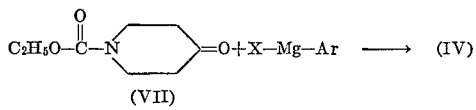

The following examples are intended to illustrate the scope of the present invention. Unless otherwise specified, all parts are by weight.

EXAMPLE I (A) To a solution of phenylmagnesiumchloride, prepared in the usual manner starting from 1.48 parts of magnesium and 6.86 parts of chlorobenzene in 300 parts of tetrahydrofuran, is added at reflux temperature a solution of 6.85 parts of 1-(ethoxy-carbonyl)-4-oxo-piperidine in 100 parts of tetrahydrofuran. After the addition is complete, the whole is stirred overnight at room temperature. To the reaction mixture are added 130 parts of crushed ice and 370 parts of acetic acid. The aqueous phase is separated and extracted with benzene. The combined organic layers are dried and evaporated. To the oily residue are added 100 parts of toluene and the whole is kept at 0° C. The precipitated product is filtered off and dried, yielding 1-(ethoxy-carbonyl) - 4 - hydroxy-4-phenyl-piperidine; M.P. 136.2–154.6° C.

(B) To a solution of 4-chloro-phenylmagnesiumchloride, prepared in the usual manner starting from 2.96 parts of magnesium, 17.95 parts of 1,4-dichloro-benzene in 400 parts of tetrahydrofuran is added (below reflux temperature) a solution of 13.7 parts of 1-(ethoxy-carbonyl)-4-oxo-piperidine in 300 parts of tetrahydrofuran (the addition is done at such a rate that reflux temperature is maintained). After the addition is complete, the whole is stirred overnight at room temperature. The reaction mixture is poured onto a mixture of 300 parts of crushed ice and 744 parts of acetic acid. The aqueous layer is extracted with benzene. The combined organic layers are dried and evaporated at diminished pressure. The residue is crystallized from toluene. The solid is filtered off and dried, yielding 1-(ethoxy-carbonyl)-4-hydroxy - 4 - (4 - chloro-phenyl)-piperidine; M. P. 114.8–121.2° C.

(C) A solution of 3 - trifluoromethyl-phenyl magnesiumbromide is prepared in the usual manner starting from 194 parts of magnesium and 1800 parts of 3-bromo-benzotrifluoride in 5000 parts of tetrahydrofuran. To this solution is added dropwise a solution of 904 parts of 1-(ethoxy-carbonyl) - 4 - oxo-piperidine in 1000 parts of tetrahydrofuran (exothermic reaction: reflux temperature is maintained). After the addition is complete, the reaction mixture is cooled to room temperature and is then stirred overnight. The mixture is poured onto a mixture of 2000 parts of crushed ice and 480 parts of glacial acetic acid. The aqueous phase is separated and extracted twice with 1600 parts of benzene. The combined extracts are stirred with activated charcoal, filtered over hyflo and the filtrate is evaporated to dryness. The oily residue is poured into toluene and after cooling to 0° C., the precipitated solid product is filtered off and dried in vacuo, yielding 1-(ethoxy-carbonyl)-4-hydroxy-4-(3-trifluoromethyl-phenyl)-piperidine; M.P. 142–145.6° C.

(D) A mixture of 155 parts of 4-hydroxy-4-(4-tolyl)-piperidine, 101 parts of triethylamine in 2250 parts of chloroform is stirred at room temperature until all solid enters solution. Then there is added dropwise 108.5 parts of ethyl chloroformate (slightly exothermic reaction). After the addition is complete, the whole is stirred for 2 days at room temperature. The reaction mixture is washed with 2000 parts of water. The organic layer is separated, dried, filtered and evaporated in vacuo. The oily residue solidifies on triturating in diisopropylether. The solid product is filtered off and dried, yielding 1-(ethoxy-carbonyl)-4-hydroxy - 4 - (4 - tolyl)-piperidine; M.P. 116–117° C.

EXAMPLE II

A mixture of 113.4 parts of 1-(ethoxy-carbonyl)-4-hydroxy-4-(4-chloro-phenyl)-piperidine, 80 parts of sodamide in 800 parts of toluene is stirred and refluxed for 5 hours. After cooling the mixture to 50° C., there is added portionwise 68.8 parts of N - (2 - chloro-ethyl)-diethylamine hydrochloride. After the addition is complete, the whole is first stirred for 30 minutes at 50° C., and further stirred and refluxed for 5 hours. 500 parts of water are then added. The organic layer is separated, dried over magnesium sulfate, filtered and evaporated in vacuo. The oily residue is distilled, to yield 1-(ethoxy-carbonyl)-4 - (4 - chloro-phenyl)-4-(2-diethylamino-ethoxy)-piperidine; B.P. 199–208° C. at 1.5 mm. pressure.

A mixture of 38.5 parts of 1-(ethoxy-carbonyl)-4-(4-chloro - phenyl)-4-(2-diethylamino-ethoxy)-piperidine, 35 parts of potassium hydroxide, 280 parts of 2-propanol and 1 part of water is stirred and refluxed for 18 hours. After cooling, the reaction mixture is evaporated. The residue is divided between water and chloroform. The chloroform layer is separated, dried over magnesium sulfate, filtered and evaporated. The oily residue is distilled in vacuo, yielding 4-(4-chloro-phenyl)-4-(2-diethylamino-ethoxy)-piperidine; B.P. 154–159° C. at 0.3 mm. pressure.

A mixture of 6.18 parts of N-(2-bromo-ethyl)-aniline hydrobromide, 6.2 parts of 4-(4-chloro-phenyl)-4-(2-diethylamino-ethoxy)-piperidine, 8.48 parts of sodium carbonate, a few crystals of potassium iodide 200 parts of 4-methyl-2-pentanone is stirred and refluxed for 2 days. After cooling to room temperature, there is added 250 parts of water. The organic layer is separated, dried, filtered and evaporated. The oily residue is dissolved in 80 parts of boiling methanol. To this hot solution is added a warm solution of 7.5 parts of oxalic acid dihydrate in 24 parts of methanol. After cooling to room temperature, the precipitated solid is filtered off and dried, yielding 1-(2-anilino-ethyl) - 4 - (4-chloro-phenyl)-4-(2-diethylamino - ethoxy) - piperidine trioxalate; M.P. 134–160° C. (dec.).

EXAMPLE III

A mixture of 4.3 parts of N-(2-chloro-acetyl)-2,6-dimethyl-aniline, 6.2 parts of 4-(4-chloro-phenyl) - 4 - (2-diethylamino - ethoxy) - piperidine, 6.36 parts of sodium carbonate, a few crystals of potassium iodide in 200 parts of 4-methyl-2-pentanone is stirred and refluxed for 2 days. After cooling there is added 200 parts of water. The organic layer is separated, dried, filtered and evaporated. The oily residue is dissolved in diisopropylether. This solution is filtered hot and after cooling the filtrate to room temperature, the precipitated product is filtered off and dried, yielding 1-[(2,6 - dimethyl-anilino-carbonyl)-methyl] - 4 - (4 - chloro - phenyl) - 4 - (2-diethylamino-ethoxy)-piperidine; M.P. 120–122.5° C.

EXAMPLE IV

A mixture of 4 parts of phenethylbromide, 6.2 parts of 4-(4-chloro-phenyl) - 4 - (2-diethylamino-ethoxy)-piperidine, 6.36 parts of sodium carbonate, a few crystals of potassium iodide in 200 parts of n-butanol is stirred and refluxed for 2 days. After cooling, there is added 200 parts of water. The organic layer is separated, dried, filtered and evaporated. The oily residue is dissolved in diisopropylether. This solution is filtered and to the filtrate is added, while stirring, absolute denatured ethanol previously saturated with gaseous hydrogen bromide. The precipitated salt is filtered off and recrystallized from 2-propanol, yielding 1-phenethyl-4-(4-chloro-phenyl)-4-(2 - diethylamino - ethoxy) - piperidine dihydrobromide; M.P. 228–229° C.

EXAMPLE V

To a hot mixture of 62.2 parts of 1-(ethoxy-carbonyl)-4-hydroxy-4-(4-chloro-phenyl)-piperidine and 400 parts of toluene is added, portionwise, 11.5 parts of lithium-amide. After the addition is complete, the whole is stirred and refluxed for 5 hours. The mixture is cooled to 50° C., and there is added slowly 44 parts of 1-(3-chloro-propyl)-piperidine hydrochloride. The whole is further stirred at this temperature for 30 minutes, followed by stirring and refluxing for 15 hours. After cooling, 300 parts of water is added to the reaction mixture. The aqueous layer is separated, and extracted with toluene. The combined toluene layers are dried over potassium carbonate, filtered and evaporated, yielding 84 parts of 1-(ethoxy-carbonyl)-4-(4-chloro-phenyl)-4-(3-piperidino - propoxy) - piperidine. This crop is stirred and refluxed for 40 hours together with 84 parts of potassium hydroxide in 672 parts of 2-propanol. This mixture is cooled and evaporated in vacuo. The residue is poured onto water. After extraction with toluene, the extract is dried, filtered and evaporated. The oily residue is distilled in vacuo, yielding oily 4-(4-chloro-phenyl)-4-(3-piperidino-propoxy)-piperidine; B.P. 170–175° C. at 0.2 mm. pressure.

A mixture of 4.3 parts of N-(2-chloro-acetyl)-2,6-dimethyl-aniline, 6.7 parts of 4-(4-chloro-phenyl)-4-(3-piperidino-propoxy)-piperidine, 6.36 parts of sodium carbonate, a few crystals of potassium iodide in 200 parts of 4-methyl-2-pentanone is stirred and refluxed for 2 days. After cooling, there is added 200 parts of water. The organic layer is separated, dried, filtered and evaporated. The oily residue is dissolved in 80 parts of boiling absolute denatured ethanol. To this hot solution is added a warm solution of 5 parts of oxalic acid dihydrate in 40 parts of absolute denatured ethanol. After cooling to room temperature, the precipitated salt is filtered off and recrystallized from ethanol, yielding 1-[(2,6-dimethyl-anilino-carbonyl) - methyl]-4-(4-chloro-phenyl)-4-(3-piperidino-propoxy)-piperidine dioxalate; M.P. 161–181° C. (dec.).

EXAMPLE VI

To a mixture of 28.35 parts of 1-(ethoxy-carbonyl)-4-hydroxy-4-(4-chloro-phenyl)-piperidine and 160 parts of toluene is added 20 parts of sodamide and the whole is stirred and refluxed for 5 hours. After cooling to 50° C., there is added 18.4 parts of 1-(2-chloro-ethyl)-piperidine hydrochloride and the whole is stirred and refluxed for another 5 hours. The reaction mixture is cooled to room temperature and there is added 300 parts of water. The organic layer is separated, dried over magnesium sulfate, filtered and evaporated in vacuo, yielding 30 parts of oily 1-(ethoxy-carbonyl)-4-(4-chloro-phenyl) - 4-(2 - piperidino-ethoxy)-piperidine. This product is stirred and refluxed for 20 hours together with 30 parts of potassium hydroxide, 240 parts of 2-propanol and 1 part of water. After cooling, the whole is evaporated in vacuo. The residue is divided between water and chloroform. The chloroform layer is separated, dried over magnesium sulfate, filtered and evaporated. The oily residue is distilled in vacuo, yielding 4-(4-chloro-phenyl)-4-(2-piperidino-ethoxy)-piperidine; B.P. 162–167° C. at 0.1 mm. pressure.

A mixture of 4.7 parts of N-(2-chloro-acetyl)-2,6-dimethyl-aniline, 6.5 parts of 4-(4-chloro-phenyl)-4-(2-piperidino-ethoxy)-piperidine, 6.4 parts of sodium carbonate, a few crystals of potassium iodide in 160 parts of 4-methyl-2-pentanone is stirred and refluxed for 48 hours. After cooling, there is added 150 parts of water. The organic layer is separated, dried and evaporated. The solid residue is recrystallized from a mixture of 2-propanol and diisopropylether, and after drying overnight at 100° C., 1-[(2,6-dimethyl-anilino-carbonyl)-methyl] - 4 - (4 - chloro-phenyl)-4-(2-piperidino-ethoxy)-piperidine is obtained; M.P. 142.5–144° C.

EXAMPLE VII

A mixture of 4 parts of phenethylbromide, 6.4 parts of 4-(4-chloro-phenyl)-4-(2-piperidino-ethoxy) - piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated in vacuo. The oily residue is dissolved in anhydrous ether. This solution, containing 1-phenethyl-4-(4-chloro-phenyl)-4-(2-piperidino - ethoxy)-piperidine, is filtered and gaseous hydrogen bromide is introduced into the filtrate. The precipitated salt is filtered off and recrystallized from 2-propanol, yielding 1-phenethyl-4-(4-chloro-phenyl)-4-(2-piperidino-ethoxy) - piperidine dihydrobromide; M.P. 250–251° C.

EXAMPLE VIII

A mixture of 6.2 parts of N-(2-bromo-ethyl)-aniline hydrobromide, 6.4 parts of 4-(4-chloro-phenyl)-4-(2-piperidino-ethoxy)-piperidine, 8.48 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in ether and to this solution is added ethanol previously saturated with gaseous hydrogen bromide. The precipitated salt is filtered off and recrystallized from a mixture of acetone and 2-propanol, yielding 1-(2-anilino-ethyl)-4-(4-chlorophenyl) - 4 - (2-piperidino-ethoxy)-piperidine dihydrobromide; M.P. 178–182° C. (dec.).

EXAMPLE IX

A mixture of 100 parts of 1-(ethoxy-carbonyl)-4-hydroxy-4-phenyl-piperidine, 80 parts of sodamide and 800 parts of toluene is stirred and refluxed for 3 hours. After cooling to 50° C., there is added 73.6 parts of 1-(2-chloro-ethyl)-piperidine hydrochloride and the whole is further stirred and refluxed for 15 hours. After cooling the reaction mixture to room temperature, there is added 500 parts of water. The aqueous layer is separated and washed once more with toluene. The organic layers are dried over magnesium sulfate, filtered and evaporated, yielding 117 parts of oily 1-(ethoxy-carbonyl)-4-phenyl-4-(2-piperidino-ethoxy)-piperidine. This product is stirred and refluxed together with 120 parts of potassium hydroxide, 960 parts of 2-propanol, and 2 parts of water for 18 hours. After cooling, the mixture is evaporated in vacuo. To the residue is added 500 parts of water. The whole is extracted with ether. The extract is dried over magnesium sulfate, filtered and evaporated. The oily residue is distilled in vacuo. The obtained product is poured into ether. The whole is filtered and the filtrate is evaporated in vacuo. The oily residue is distilled once more to yield 4-phenyl-4-(2-piperidino-ethoxy)-piperidine; B.P. 169–173° C. at 0.1 mm. pressure.

A mixture of 4.3 parts of N-(2-chloro-acetyl)-2,6-dimethyl-aniline, 5.6 parts of 4-phenyl-4-(2-piperidino-ethoxy)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of boiling 2-propanol. To this hot solution is added a warm solution of 5 parts of oxalic acid dihydrate in 40 parts of 2-propanol. The whole is boiled for a few minutes and while boiling there is added 200 parts of methanol. The solution is filtered hot and after cooling the filtrate to room temperature, the precipitated solid salt is filtered off and recrystallized from methanol, yielding 1-[(2,6-dimethyl-anilino-carbonyl)-methyl]-4-phenyl-4-(2-piperidino-ethoxy) - piperidine dioxalate; M.P. 172–186° C.

EXAMPLE X

A mixture of 5.2 parts of N-(2-bromo-ethyl)-aniline hydrobromide, 5.6 parts of 4-phenyl-4-(2-piperidino-ethoxy)-piperidine, 8.48 parts of sodium carbonate, a few crystals of potassium iodide in 200 parts of 4-methyl-2-pentanone is stirred and refluxed for 2 days. After cooling, there is added 150 parts of water. The organic layer is separated, dried, filtered and evaporated. The oily residue is dissolved in 80 parts of boiling methanol. To this hot solution is added a warm solution of 7.5 parts of oxalic acid dihydrate in 40 parts of methanol. After cooling to room temperature, the precipitated solid salt is filtered off and recrystallized from methanol, yielding 1-(2-anilino-ethyl)-4 - phenyl - 4-(2-piperidino-ethoxy)-piperidine dioxalate; M.P. 148–159° C. (dec.).

EXAMPLE XI

A mixture of 4 parts of phenethylbromide, 5.6 parts of 4-phenyl-4-(2-piperidino-ethoxy)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of boiling methanol. To this hot solution is added a warm solution of 5 parts of oxalic acid dihydrate in 24 parts of methanol. After cooling to room temperature, the precipitated salt is filtered off and recrystallized from a mixture of acetonitrile and methanol, yielding 1-phenethyl - 4-phenyl-4-(2-piperidino-ethoxy)-piperidine dioxalate; M.P. 164.5–184.5° C. (dec.).

EXAMPLE XII

A mixture of 4.5 parts of 4-fluoro-phenethylbromide, 6.4 parts of 4-(4-chloro-phenyl)-4-(2-piperidino-ethoxy)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in disopropylether. To this solution is added ethanol previously saturated with hydrobromic acid solution. The precipitated product is filtered off and recrystallized from a mixture of acetone and 2-propanol, yielding 1-(4-fluorophenethyl) - 4 - (4 - chloro - phenyl) - 4 - (2-piperidinoethoxy)-piperidine dihydrobromide; M.P. 200–213.5° C.

EXAMPLE XIII

To a stirred and refluxed mixture of 158 parts of 1-(ethoxy - carbonyl) - 4 - hydroxy - 4 - (3-trifluoromethylphenyl)-piperidine in 800 parts of toluene is added portionwise 34.5 parts of lithiumamide (slightly exothermic reaction). After the addition is complete, the whole is stirred and refluxed for an additional hour. The mixture is cooled to 100° C. and there is added portionwise 110.5 parts of 1-(2-chloro-ethyl)-piperidine hydrochloride. The whole is further stirred and refluxed for 20 hours. The reaction mixture is cooled and decomposed with water. The aqueous layer is separated and extracted with toluene. The extract is dried, filtered and evaporated, yielding 1-(ethoxy - carbonyl) - 4 - (2 - piperidino - ethoxy) - 4 - (3-trifluoromethyl-phenyl)-piperidine. This product is stirred and refluxed for two days together with 185 parts of potassium hydroxide and 1440 parts of 2-propanol. The mixture is evaporated. To the residue is added 1000 parts of water. This aqueous solution is extracted with toluene. The extract is dried over potassium carbonate, filtered and evaporated. The oily residue is distilled in vacuo, yielding 4-(2-piperidino-ethoxy)-4-(3-trifluoromethyl-phenyl)-piperidine; B.P. 162–165° C., at 0.7 mm. pressure.

A mixture of 8.4 parts of N-(2-bromo-ethyl)-aniline hydrobromide, 8.9 parts of 4-(2-piperidino-ethoxy)-4-(3-trifluoromethyl-phenyl)-piperidine, 8.48 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. After cooling to room temperature, the precipitated solid salt is filtered off and dried, yielding 12 parts of 1-(2-anilinoethyl) - 4 - (2 - piperidino-ethoxy)-4-(3-trifluoromethylphenyl)-piperidine dioxalate; M.P. 165.5–170° C.

EXAMPLE XIV

To a boiled solution of 125 parts of 1-(ethoxy-carbonyl)-4-hydroxy-4-phenyl-piperidine in 800 parts of toluene is added portionwise 34.5 parts of lithiumamide (slightly exothermic reaction). After the adition is complete, the mixture is stirred and refluxed for one hour. After cooling to 100° C., there is added portionwise 120 parts of N-(2-chloro-ethyl)-diisopropylamine hydrochloride and the whole is then stirred and refluxed for 20 hours. After cooling the reaction mixture is decomposed by the addition of water. The aqueous phase is extracted with toluene. The combined toluene layers are dried, filtered and evaporated, leaving 189 parts of oily 1-(ethoxy - carbonyl) - 4 - phenyl-4-(2-diisopropylaminoethoxy)-piperidine. This product is stirred and refluxed for 20 hours with 189 parts of potassium hydroxide and 2240 parts of 2-propanol. After cooling the reaction mixture, the solvent is evaporated in vacuo. To the residue is added 1000 parts of water. The product is extracted with toluene. The extract is dried over magnesium sulfate, filtered and evaporated. The oily residue is distilled in vacuo, yielding oily 4-phenyl-4-(2-diisopropylaminoethoxy)-piperidine; B.P. 173–177° C. at 1.5 mm. pressure.

A mixture of 4.3 parts of N-(2-chloro-acetyl)-2,6-dimethyl-aniline, 6 parts of 4-phenyl-4-(2-diisopropylaminoethoxy)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, and extracted with diluted hydrochloric acid solution. The acid layer is alkalized and extracted with ether. The ether extract is dried over magnesium sulfate, filtered and evaporated in vacuo. The solid residue is recrystallized from diisopropylether, yield 1-[(2,6-dimethylanilino-carbonyl) - methyl] - 4 - phenyl - 4-(2-diisopropylamino-ethoxy)-piperidine; M.P. 92–93° C.

EXAMPLE XV

A mixture of 5.5 parts of phenethylbromide, 8.9 parts of 4-(2-piperidino-ethoxy)-4-(3-trifluoromethyl - phenyl)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of boiling 2-propanol. To this hot solution is added a warm solution of 6.25 parts of oxalic acid dihydrate in 40 parts of methanol. After cooling to room temperature, the precipitated solid salt is filtered off and dried, yielding 1 - phenethyl-4-(2-piperidino-ethoxy)-4-(3-trifluoromethyl-phenyl)-piperidine dioxalate; M.P. 192–194° C.

EXAMPLE XVI

A mixture of 6 parts of N-(2-chloro-acetyl)-2,6-dimethyl-aniline, 8.9 parts of 4-(2-piperidino-ethoxy)-4-(3-trifluoromethyl-phenyl)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, and evaporated. The oily residue is dissolved in 80 parts of boiling 2-propanol. To this hot solution is added a warm solution of 6.25 parts of oxalic acid dihydrate in 80 parts of 2-propanol. After cooling to room temperature, the precipitated product is filtered off and dried, yielding 1-[(2,6-dimethylanilino-carbonyl)-methyl] - 4 - (2 - piperidino-ethoxy)-4-(3-trifluoromethyl - phenyl) - piperidine dioxalate; M.P. 181.5–186° C. (dec.).

EXAMPLE XVII

A mixture of 6 parts of 1-bromo-2-(4-fluoro-phenyl)-ethane, 8.9 parts of 4-(3-trifluoromethyl-phenyl) - 4 - (2-piperidino-ethoxy)-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of boiling 2-propanol. To this hot solution is added a boiling solution of 6.25 parts of oxalic acid dihydrate in 40 parts of methanol. After cooling to room temperature, the precipitated product is filtered off and dried, yielding 1-[2-(4-fluoro-phenyl)-ethyl] - 4 - (3 - trifluoromethyl-phenyl)-4-(2-piperidino - ethoxy) - piperidine dioxalate; M.P. 181–183° C. (dec.).

EXAMPLE XVIII

To a stirred and refluxing mixture of 140 parts of 1-(ethoxy-carbonyl) - 4 - hydroxy-4-(4-chloro - phenyl)-piperidine in 800 parts of toluene is added portionwise 34.5 parts of lithiumamide (slightly exothermic reaction). After the addition is complete, the whole is stirred and refluxed for one hour. The mixture is cooled to about 100° C. and there is added portionwise 86.5 parts of N-(2-chloro-ethyl)-dimethylamine hydrochloride. The whole is stirred and refluxed for 20 hours. The mixture is cooled and decomposed by the addition of water. The product is extracted with toluene. The extract is dried, filtered and evaporated, yielding 169.5 parts of 1-(ethoxy-carbonyl)-4 - (4 - chloro-phenyl) - 4 - (2 - dimethylamino-ethoxy)-piperidine. This product is stirred and refluxed for 2 days together with 169.5 parts of potassium hydroxide and 1350 parts of 2-propanol. After cooling, the mixture is evaporated in vacuo. To the residue is added 1000 parts of water and the product is extracted with toluene. The extract is dried over magnesium sulfate, filtered and evaporated. The oily residue is distilled in vacuo, yielding 4-(4-chloro-phenyl) - 4 - (2 - dimethylamino-ethoxy)-piperidine; B.P. 170–173° C. at 1.7 mm. pressure.

A mixture of 8.4 parts of N-(2-bromo-ethyl)-aniline hydrobromide, 7 parts of 4-(2-dimethylamino-ethoxy)-4-(4-chlorophenyl)-piperidine, 8.48 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. After cooling to room temperature, the precipitated product is filtered off and recrystallized from methanol, yielding 1 - (2 - anilino-ethyl)-4-(2-dimethylamino - ethoxy)-4- (4-chloro-phenyl)-piperidine dioxalate; M.P. 116.5–130° C. (dec.).

EXAMPLE XIX

A mixture of 3.5 parts of 1-chloro-2-(4-methyl-phenyl)-ethane, 6.4 parts of 4-(2-piperidino-ethoxy)-4-(4-chloro-phenyl)-piperidine, 6.36 parts of sodium carbonate, a few crystals of potassium iodide in 200 parts of 4-methyl-2-pentanone is stirred and refluxed for 2 days. After cooling there is added 200 parts of water. The organic layer is separated, dried, filtered and evaporated. The oily residue is dissolved in diisopropylether and gaseous hydrogen bromide is introduced into the solution. The precipitated product is filtered off and recrystallized twice: first from a mixture of acetone and 2-propanol and then from 2-propanol, yielding 1 - (4 - methyl-phenethyl)-4-(2-piperidino-ethoxy)-4-(4-chloro - phenyl) - piperidine dihydrobromide; M.P. 205–206.5° C.

EXAMPLE XX

A mixture of 5.9 parts of 1-bromo-3-phenyl-propane, 8 parts of 4-(4-chloro-phenyl) - 4 - (2 - piperidino-ethoxy)-piperidine, 6.36 parts of sodium carbonate, a few crystals of potassium iodide in 200 parts of 4-methyl-2-pentanone is stirred and refluxed for 2 days. After cooling, there is added 250 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. The precipitated solid salt is filtered off and dried, yielding 1-(3-phenyl-propyl)-4-(4-chloro-phenyl)-4-(2-piperidino - ethoxy) - piperidine dioxalate; M.P. 150–164° C.

EXAMPLE XXI

To a stirred and refluxing solution of 125 parts of 1-(ethoxy-carbonyl)-4-hydroxy-4-phenyl-piperidine in 800 parts of toluene is added portionwise 34.5 parts of lithium amide (exothermic reaction). After the addition is complete, the whole is further stirred and refluxed for one hour. The mixture is cooled to 100° C. and there is added portionwise 103 parts of N-(2-chloroethyl)-diethylamine hydrochloride, whereupon the whole is stirred and refluxed for 20 hours. The reaction mixture is cooled and decomposed by the addition of water. The aqueous layer is separated and extracted with toluene. The extract is dried over magnesium sulfate, filtered and evaporated, yielding 162 parts of 1-(ethoxy-carbonyl)-4-(2-diethylamino-ethoxy)-4-phenyl-piperidine. This product is stirred and refluxed for 2 days together with 162 parts of potassium hydroxide in 1280 parts of 2-propanol. The mixture is evaporated and to the residue is added 1000 parts of water. The product is extracted with toluene. The extract is dried over magnesium sulfate, filtered and evaporated. The oily residue is distilled in vacuo, yielding 4-(2-diethylamino-ethoxy)-4-phenyl-piperidine; B.P. 152–158° C. at 1 mm. pressure.

A mixture of 5.5 parts of phenethylbromide, 6.9 parts of 4-(2-diethylamino-ethoxy) - 4 - phenyl-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. After cooling to room temperature, the precipitated solid product is filtered off and recrystallized from a mixture of methanol and ethanol, yielding 1 - phenethyl - 4 - (2 - diethylamino-ethoxy) - 4 - phenyl-piperidine dioxalate; M.P. 184.5–185° C. (dec.).

EXAMPLE XXII

To a stirred and refluxing solution of 158 parts of 1-(ethoxy - carbonyl) - 4 - hydroxy - 4 - (3 - trifluoromethyl-phenyl)-piperidine and 800 parts of toluene is added portionwise 34.5 parts of lithium amide. After the addition is complete, the whole is stirred and refluxed for one hour. The reaction mixture is cooled to about 100° C., and there is added portionwise 118.8 parts of 1-(2-chloro-ethyl)-hexamethyleneimine. The whole is stirred and refluxed for 20 hours. The mixture is cooled and decomposed with water. The aqueous phase is separated, and extracted with toluene. The extract is dried over magnesium sulfate, filtered and evaporated in vacuo, yielding 1 - (ethoxy - carbonyl) - 4 - (3 - trifluoromethyl-phenyl)-4-[2-(1-hexamethyleneimino)-ethoxy]piperidine. This product is stirred and refluxed for 2 days together with 222 parts of potassium hydroxide in 1600 parts of 2-propanol. The mixture is evaporated in vacuo. To the residue is added 1000 parts of water. The aqueous solution is extracted with toluene. The extract is dried, filtered and evaporated. The oily residue is distilled in vacuo, yielding 4-(3-trifluoromethyl-phenyl)-4-[2-(1-hexamethyleneimino)-ethoxy]-piperidine; B.P. 158–159° C. at 0.4 mm. pressure.

A mixture of 5.5 parts of phenethylbromide, 9.2 parts of 4 - (3-trifluoromethyl-phenyl)-4-[2-(1-hexamethyleneimino)-ethoxy]-piperidine, 6.36 parts of sodium carbonate, a few crystals of potassium iodide in 200 parts of 4-methyl-2-pentanone is stirred and refluxed for 2 days. After cooling, there is added 200 parts of water. The organic layer is separated, dried, filtered and evaporated. The oily residue is dissolved in 80 parts of boiling 2-propanol. To this hot solution is added a boiling solution of 6.25 parts of oxalic acid dihydrate in 40 parts of methanol. After cooling to room temperature, the precipitated product is filtered off and dried for 2 days at 80° C., yielding 1-phenethyl-4-(3-trifluoromethyl-phenyl)-4-[2-(1-hexamethyleneimino)-ethoxy] - piperidine dioxalate. M.P. 156–172° C.

EXAMPLE XXIII

A mixture of 8.4 parts of N-(2-bromo-ethyl)-aniline hydrobromide, 9.2 parts of 4-(3-trifluoromethyl-phenyl)-4 - [2 - (1 - hexamethylenimino)-ethoxy]-piperidine, 8.48 parts of sodium carbonate, a few crystals of potassium iodide in 200 parts of 4-methyl-2-pentanone is stirred and refluxed for 2 days. After cooling, there is added 250 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. After cooling to room temperature, the precipitated solid is filtered off and recrystallized from a mixture of methanol and 2-propanol, yielding 1-(2-anilino - ethyl) - 4 - (3 - trifluoromethyl - phenyl) - 4-[2-(1-hexamethylenimino)-ethoxy] - piperidine dioxalate; M.P. 189–191° C.

EXAMPLE XXIV

A mixture of 6 parts of N-(2-chloro-acetyl)-2,6-dimethyl-aniline, 6.9 parts of 4-(2-diethylamino-ethoxy)-4-phenyl-piperidine, 6.36 parts of sodium carbonate, a few crystals of potassium iodide in 200 parts of 4-methyl-2-pentanone is stirred and refluxed for 2 days. After cooling, there is added 250 parts of water. The organic layer is separated, dried, filtered and evaporated. The oily residue is dissolved in 80 parts of 2-propanol. To this boiling solution is added a hot solution of 6.25 parts of oxalic acid dihydrate in 40 parts of methanol. After cooling to room temperature, the precipitated product is filtered off and recrystallized from a mixture of acetone and methanol, yielding 1 - [(2,6 - dimethyl-anilino-carbonyl)-methyl]-4-phenyl-4-(2-diethylamino - ethoxy) - piperidine dioxalate; M.P. 129–135° C.

EXAMPLE XXV

To a refluxing solution of 140 parts of 1-(ethoxy-carbonyl) - 4 - hydroxy-4-(4-chloro-phenyl)-piperidine in 800 parts of toluene is added portionwise (over a period of 30 minutes) 34.5 parts of lithiumamide. After the addition is complete, the whole is cooled to 100° C. and there is added portionwise (over a period of 45 minutes) 118.8 parts of 2-chloro-ethyl-hexamethyleneimine hydrochloride. After the addition is complete, the whole is stirred and refluxed for 20 hours. The reaction mixture is cooled and decomposed with water. The aqueous phase is separated and extracted with toluene. The extract is dried, filtered and evaporated in vacuo, yielding 1-ethoxy-carbonyl - 4 - (4 - chloro - phenyl) - 4 - [2 - (1 - hexamethylenimino)-ethoxy]-piperidine hydrochloride. This product is stirred and refluxed for 2 days together with 214 parts of potassium hydroxide in 1600 parts of 2-propanol. The mixture is evaporated. To the residue is added 1000 parts of water and the product is extracted with toluene. The extract is dried, filtered and evaporated in vacuo. The residue is distilled, yielding 4-(4-chloro - phenyl) - 4 - [2 - (1 - hexamethylenimino)-ethoxy]-piperidine; B.P. 175–178° C. at 0.3 mm. pressure.

A mixture of 5.5 parts of phenethylbromide, 8.4 parts of 4-(4-chloro-phenyl) - 4 - [2-(1-hexamethylenimino)-ethoxy]-piperidine, 6.36 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. The residue is dissolved in 120 parts of boiling 2-propanol. To this hot solution is added a boiling solution of 6.15 parts of oxalic acid dihydrate in 40 parts of methanol. After cooling to room temperature, the precipitated product is filtered off and dried, yielding 1-phenethyl - 4 - (4-chloro-phenyl) - 4 - [2-(1-hexamethylenimino) - ethoxy] - piperidine dioxalate; M.P. 179–181° C. (dec.).

EXAMPLE XXVI

A mixture of 8.4 parts of N-(2-bromo-ethyl)-aniline hydromide, 8.4 parts of 4-(4-chloro-phenyl) - 4 - [2-(1-hexamethylenimino)-ethoxy]-piperidine, 8.48 parts of sodium carbonate, a few crystals of potassium iodide in 200 parts of 4-methyl-2-pentanone is stirred and refluxed for 2 days. After cooling the reaction mixture is filtered and the filtrate is evaporated. The oily residue is dissolved in 120 parts of boiling 2-propanol. To this hot solution is added a boiling solution of 6.25 parts of oxalic acid dihydrate in 40 parts of methanol. After cooilng to room temperature, the precipitated product is filtered off and dried, yielding 1-(2-anilino-ethyl) - 4 - (4-chloro-phenyl)-4-[2-(1-hexamethylenimino) - ethoxy] - piperidine dioxalate; M.P. 169–170.5° C.

EXAMPLE XXVII

A mixture of 6 parts of N-(2-chloro-acetyl)-2,6-dimethylaniline, 9.2 parts of 4-(3-trifluoromethyl-phenyl)-4-[2-(1-hexamethylenimino) - ethoxy] - piperidine, 6.36 parts of sodium carbonate a few crystals of potassium iodide in 200 parts of 4-methyl-2-pentanone is stirred and refluxed for 2 days. After cooling, the reaction mixture is filtered and the filtrate is evaporated. The oily residue is dissolved in 120 parts of boiling methanol. To this hot solution is added a hot solution of 6.25 parts of oxalic acid dihydrate in 40 parts of methanol. After cooling to room temperature, the precipitated product is filtered off and recrystallized from methanol, yielding 1-[(2,6-dimethyl - anilinocarbonyl) - methyl] - 4 - 2-(1-hexamethylenimino) - ethoxy] - 4 - (3-trifluoromethyl - phenyl)-piperidine dioxalate; M.P. 154–160° C. (dec.).

EXAMPLE XXVIII

A mixture of 8.4 parts of N-2-anilino-ethylbromide hydrobromide, 6.9 parts of 4-(2-diethylamino-ethoxy) - 4-phenyl-piperidine, 8.48 parts of sodium carbonate, a few crystals of potassium iodide in 200 parts of 4-methyl-2-pentanone is stirred and refluxed for 2 days. After cooling, there is added 50 parts of water. The organic layer is separated, dried, filtered and evaporated. The oily residue is dissolved in 80 parts of acetone. To this solution is added a solution of 7.2 parts of N-cyclohexylsulfamic acid in 80 parts of acetone. The whole is boiled for a few minutes, filtered hot and after cooling the filtrate to room temperature, the solid salt is precipitated, yielding 1-(2-aniline - ethyl) - 4 - (2-diethylamino - ethoxy)-4-phenyl-piperidine di-cyclohexylsulfamate; M.P. 110.5–122° C.

EXAMPLE XXIX

A mixture of 6.2 parts of N-2-anilino-ethylbromide hydrobromide, 6.7 parts of 4-(4-chloro-phenyl)-4-(3-piperidino-propoxy)-piperidine, 8.48 parts of sodium carbonate, a few crystals of potassium iodide in 200 parts of 4-methyl-2-pentanone is stirred and refluxed for 24 hours. After cooling, there is stirred 50 parts of water. The organic layer is separated, dried, filtered and evaporated. The oily residue is dissolved in 80 parts of acetone. To this solution is added a solution of 10.8 parts of N-cyclohexylsulfamic acid in 80 parts of acetone. The whole is boiled for a few minutes, filtered hot and after cooling the filtrate to room temperature, the precipitated salt is filtered off, yielding 1-(2-anilino-ethyl) - 4 - (4-chloro-phenyl) - 4 - (3-piperidino - propoxy) - piperidine tri-cyclohexylsulfamate; M.P. 146–179° C. (dec.).

EXAMPLE XXX

A mixture of 4.3 parts of N-(2-chloro-acetyl) - 2,4-dimethyl-aniline, 6 parts of 4-(2-diisopropylamino - ethoxy) - 4 - phenyl - piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated in vacuo. The oily residue is dissolved in 80 parts of hot acetone. To this solution is added a hot solution of 7.2 parts of N-cyclohexylsulfamic acid in 80 parts of acetone. The whole is boiled for a few minutes longer, filtered and on cooling the filtrate to room temperature, the product is precipitated. It is filtered off and dried, yielding 1-[(2,4-dimethyl - anilino - carbonyl) - methyl] - 4 - (2-diisopropylamino - ethoxy) - 4 - phenyl - piperidine di-cyclohexylsulfamate; M.P. 130–134.5° C.

EXAMPLE XXXI

A mixture of 4.8 parts of N-(2-chloro - acetyl) - 2-chloro-6-methyl-aniline, 6 parts of 4 - (2 - diisopropylamino-ethoxy)-4-phenyl-piperidine, 6.35 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated in vacuo. The oily residue is dissolved in 80 parts of hot acetone. To this solution is added a hot solution of 7.2 parts of N-cyclohexylsulfamic acid in 80 parts of acetone. On cooling to room temperature, the product is precipitated. It is filtered off and dried, yielding 1-[(2-chloro-6-methyl - anilino - carbonyl) - methyl] - 4 - (2-diisopropylamino - ethoxy) - 4 - phenyl - piperidine di-cyclohexylsulfamate; M.P. 133–136° C.

EXAMPLE XXXII

A mixture of 4.3 parts of N-(2-chloro-acetyl)-2,5-dimethylaniline, 6 parts of 4-(2-diisopropylamino - ethoxy)-4-phenyl-piperidine, 6.36 parts of sodium carbonate, a few crystals of potassium iodide in 200 parts of 4-methyl-2-pentanone is stirred and refluxed for 2 days. After cooling, there is added 100 parts of water. The organic layer is separated, dried, filtered and evaporated in vacuo. The oily residue is dissolved in 80 parts of boiling acetone. To this hot solution is added a hot solution of 7.2 parts of N-cyclohexylsulfamic acid in 80 parts of acetone. After cooling to room temperature, the product is precipitated. It is filtered off and dried, yielding 1-[2,5-dimethyl - anilino - carbonyl) - methyl] - 4 - (2-diisopropylamino- ethoxy) - 4 - phenyl - piperidine di - cyclohexylsulfamate; M.P. 130–135° C.

EXAMPLE XXXIII

A mixture of 4.9 parts of N-(2-chloro-acetyl) - 2,6-diethylaniline, 6 parts of 4-(2-diisopropylamino - ethoxy)-4-phenyl-piperidine, 6.36 parts of sodium carbonate, a few crystals of potassium iodide in 200 parts of 4-methyl-2-pentanone is stirred and refluxed for 2 days. After cooling there is added 100 parts of water. The organic layer is separated, dried, filtered and evaporated. The oily residue is dissolved in 80 parts of boiling acetone. To this hot solution is added a hot solution of 7.2 parts of N-cyclohexylsulfamic acid in 80 parts of acetone. After cooling to room temperature, the precipitated solid salt is filtered off and dried, yielding 1-[(2,6-diethylanilino-carbonyl)-methyl] - 4 - (2-diisopropylamino - ethoxy) - 4 - phenyl-piperidine di-cyclohexylsulfamate; M.P. 168–172.5° C.

EXAMPLE XXXIV

A mixture of 4.3 parts of N-(2-chloro-acetyl)-3,4-dimethylaniline, 6 parts of 4-(2-diisopropylamino-ethoxy)-4-phenylpiperidine, 6.36 parts of sodium carbonate, a few crystals of potassium iodide in 200 parts of 4-methyl-2-pentanone is stirred and refluxed for 2 days. After cooling, there is added 200 parts of water. The organic layer is separated, dried, filtered and evaporated. The oily residue is dissolved in 80 parts of boiling acetone. To this solution is added a hot solution of 7.2 parts of N-cyclohexylsulfamic acid in 80 parts of acetone. After cooling to room temperature, the precipitated solid salt is filtered off and dried, yielding 1-[(3,4-dimethyl - anilino - carbonyl)-methyl]-4-(2-diisopropylamino-ethoxy) - 4 - phenyl-piperidine di-cyclohexyl-sulfamate; M.P. 148–151° C.

EXAMPLE XXXV

A mixture of 6.2 parts of N-(2-bromo-ethyl)-aniline hydrobromide, 6 parts of 4-(2-diisopropylamino-ethoxy)-4-phenylpiperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. The oily residue is dissolved in 80 parts of acetone. To this boiling solution is added a hot solution of 7.2 parts of N-cyclohexylsulfamic acid in 80 parts of acetone. After cooling to room temperature, the precipitated solid salt is filtered off and recrystallized from acetone, yielding 1 - (2 - anilino-ethyl) - 4 - (2-diisopropylamino-ethoxy) - 4 - phenyl - piperidine di-cyclohexylsulfamate; M.P. 135–141° C.

EXAMPLE XXXVI

To a stirred and refluxing solution of 131.5 parts of 1-(ethoxy-carbonyl)-4-hydroxy - 4 - (4-tolyl)-piperidine in 1200 parts of toluene is added portionwise 34.5 parts of lithiumamide (exothermic reaction). After the addition is complete, the whole is stirred and refluxed for an additional 3 hours. The whole is cooled to 100° C. and there is added portionwise 120 parts of N-(2-chloro-ethyl)-diisopropylamine hydrochloride. The mixture is further stirred and refluxed for 20 hours. The reaction mixture is cooled and decomposed by the addition of water. The organic layer is separated, dried, filtered and evaporated. The residue is stirred and refluxed for 2 days together with 193 parts of potassium hydroxide and 1570 parts of 2-propanol. After cooling, the solution is evaporated. To the residue are added 1000 parts of water. The free base is extracted with toluene. The extract is dried, filtered and evaporated. The oily residue is distilled in vacuo, yielding oily 4 - (2-diisopropylamino-ethoxy)-4-(4-tolyl)-piperidine; B.P. 152–159° C. at 0.4 mm. pressure.

A mixture of 4.4 parts of 1-bromo-3-phenyl-propane, 6.36 parts of 4-(2-diisopropylamino-ethoxy)-4-(4-tolyl)-piperidine, 6.36 parts of sodium carbonate, a few crystals of potassium iodide in 200 parts of 4-methyl-2-pentanone is stirred and refluxed for 2 days. After cooling, the reaction mixture is filtered and the filtrate is evaporated. The oily free base is dissolved in 80 parts of acetone. To this boiling solution is added a hot solution of 7.2 parts of N-cyclohexylsulfamic acid in 80 parts of acetone. The solution is filtered hot and on cooling the filtrate to room temperature, the precipitated solid salt is filtered off, yielding 1-(3-phenyl-propyl)-4-(2-diisopropylamino-ethoxy)-4-(4-tolyl)-piperidine di-cyclohexylsulfamate; M.P. 134–136° C.

EXAMPLE XXXVII

To a stirred and refluxing mixture of 125 parts of 1-(ethoxy-carbonyl)-4-hydroxy-4-phenyl-piperidine in 1200 parts of toluene is added portionwise 34.5 parts of lithium amide (exothermic reaction). After the addition is complete, the whole is stirred and refluxed for 30 minutes longer. The reaction mixture is cooled to 100° C. and then there is added portionwise 111.6 parts of N-(3-chloro-propyl)-diethylamine hydrochloride. The whole is further stirred and refluxed for 20 hours. After cooling, the mixture is decomposed by the addition of water. The organic phase is separated, dried, filtered and evaporated in vacuo. The residue is stirred and refluxed for 2 days together with 170 parts of potassium hydroxide in 1360 parts of 2-propanol. After cooling, the whole is evaporated in vacuo. To the residue is added 2000 parts of water. The product is extracted with toluene. The extract is dried, filtered and the filtrate is evaporated in vacuo. The oily residue is distilled in vacuo, yielding oily 4-(3-diethylamino-propoxy)-4-phenyl-piperidine; B.P. 148–153° C. at 0.3 mm. pressure.

A mixture of 6.2 parts of N-(2-bromoethyl)-aniline hydrobromide, 5.8 parts of 4-(3-diethylamino-propoxy)-4-phenyl piperidine, 8.48 parts of sodium carbonate and a few crystals of potassium iodide in 200 parts of 4-methyl-2-pentanone is stirred and refluxed for 2 days. After cooling, the reaction mixture is filtered and the filtrate is evaporated. The oily residue is dissolved in 80 parts of acetone. To this boiling solution is added a hot solution of 7.2 parts of N-cyclohexylsulfamic acid in 80 parts of acetone. After cooling to room temperature, the precipitated product is filtered off, yielding 1-(2-anilino-ethyl)-4-(3-diethylamino-propoxy) - 4 - phenyl-piperidine di-cyclohexylsulfamate; M.P. 127–130.5° C.

EXAMPLE XXXVIII

A mixture of 6.2 parts of N-(2-bromoethyl)-aniline hydrobromide, 6.36 parts of 4 - (2 - diisopropylamino-ethoxy)-4-(4-tolyl)-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. The oily residue is dissolved in 80 parts of acetone. To this boiling solution is added a hot solution of 7.2 parts of N-cyclohexylsulfamic acid in 80 parts of acetone. The whole is boiled for a few minutes longer and diisopropylether is added until turbid. After cooling to room temperature, the precipitated solid salt is filtered off and recrystallized from 2-propanol, yielding 1-(2-anilino-ethyl) - 4 - (2-diisopropylamino-ethoxy)-4-(4-tolyl)-piperidine di-cyclohexylsulfamate; M.P. 159–163° C.

EXAMPLE XXXIX

To a stirred and refluxing mixture of 75 parts of 1-(ethoxy-carbonyl)-4-hydroxy - 4 - phenyl-piperidine in 640 parts of toluene is added portionwise 20.7 parts of lithiumamide. After the addition is complete, the whole is stirred and refluxed for one hour. At a temperature of 100° C., there is added portionwise 71 parts of 1-(3-chloro-propyl)-piperidine hydrochloride and, after completion, the whole is stirred and refluxed for 20 hours. The reaction mixture is cooled and decomposed with water. The aqueous phase is separated and extracted with toluene. The combined toluene layers are dried over magnesium sulfate, filtered and evaporated in vacuo, yielding 1-ethoxy-carbonyl-4-phenyl - 4 - (3 - piperidino-propoxy)-piperidine. This product is heated to reflux temperature together with 119 parts of potassium hydroxide and 950 parts of 2-propanol. The solvent is evaporated in vacuo. To the residue is added 100 parts of water and the product is extracted with toluene. The extract is dried over magnesium sulfate, filtered and evaporated. The oily residue is distilled in vacuo, yielding oily magnesium sulfate, filtered and evaporated. The oily residue is distilled in vacuo, yielding oily 4-phenyl-4-(3-piperidino-propoxy)-piperidine; B.P. 170–174° C. at 0.5 mm. pressure.

A mixture of 6.2 parts of N-(2-bromoethyl)-aniline hydrobromide, 6 parts of 4-phenyl-4-(3-piperidino-propoxy)-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily free base the cyclohexylsulfamate salt is prepared in the usual manner in acetone. The crude salt is recrystallized twice: first from a mixture of acetone and 2-propanol and from acetonitrile, yielding 1-(2-anilino-ethyl) - 4 - phenyl-4-(3-piperidino-propoxy)-piperidine di-cyclohexylsulfamate; M.P. 164.5–168.5° C.

EXAMPLE XL

A mixture of 4 parts of phenethylbromide, 6 parts of 4-phenyl-4-(3-piperidino-propoxy)-piperidine, 6.36 parts of sodium carbonate, a few crystals of potassium iodide in 200 parts of 4-methyl-2-pentanone is stirred and refluxed for 2 days. After cooling, the reaction mixture is filtered and evaporated in vacuo. From the oily free base the cyclohexylsulfamate salt is prepared in the usual manner in acetone, yielding 1-phenethyl-4-phenyl-4-(3-piperidino-propoxy)-piperidine di-cyclohexylsulfamate; M.P. 216–223° C.

EXAMPLE XLI

To a stirred and refluxing solution of 125 parts of 1-(ethoxy-carbonyl)-4-hydroxy-4-phenyl-piperidine in 1200 parts of toluene is added portionwise 34.5 parts of lithium amide. After the addition is complete, the whole is stirred and refluxed for 15 minutes. Then there is added portionwise 136.8 parts of N-(2-chloro-ethyl)-diisobutylamine hydrochloride and the whole is stirred and refluxed for an additional 20 hours. The reaction mixture is cooled and decomposed with water. The organic layer is separated, dried, and evaporated. The oily residue is stirred and refluxed for 2 days together with 186 parts of potassium hydroxide in 1280 parts of 2-propanol. The mixture is cooled and evaporated. To the residue is added 2000 parts of water. It is extracted with toluene and the extract is dried, filtered and evaporated. The oily residue is distilled, yielding 4-(2-diisobutylamino-ethoxy) - 4 - phenyl-piperidine; B.P. 160° C. at 0.5 mm. pressure.

A mixture of 5.2 parts of N-(2-chloro-acetyl)-2,6-dichloroaniline, 6.6 parts of 4-(2-diisobutylamino-ethoxy)-4-phenyl-piperidine, 6.36 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. The solid residue is recrystallized from diisopropylether, yielding 1-[(2,6-dichloro-anilino-carbonyl)-methyl] - 4 - (2 - diisobutylamino-ethoxy)-4-phenyl-piperidine; M.P. 117–118.5° C.

EXAMPLE XLII

A mixture of 4.4 parts of 1-bromo-3-phenyl-propane, 6 parts of 4-phenyl-4-(3-piperidino-propoxy)-piperidine, 6.36 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. From the oily free base the cyclohexylsulfamate salt is prepared in the usual manner in acetone and 2-propanol, yielding 1 - (3-phenyl-propyl)-4-phenyl-4-(3-piperidinopropoxy)-piperidine tri-cyclohexylsulfamate; M.P. 156.5–193.5° C. (dec.).

EXAMPLE XLIII

To a stirred and refluxing mixture of 175 parts of 1-(ethoxy-carbonyl) - 4 - hydroxy - 4 - phenyl-piperidine in 1600 parts of toluene is added portionwise 48 parts of lithium amide. After the addition is complete, the whole is cooled to about 100° C. and there are added portionwise 129.6 parts of N-(2-chloro-ethyl)-dimethylamine hydrochloride. The whole is further stirred and refluxed for another 20 hours. The reaction mixture is cooled and decomposed by the addition of water. The organic layer is separated, dried, filtered and evaporated. The oily residue, together with 200 parts of potassium hydroxide and 1600 parts of 2-propanol, is stirred and refluxed for 2 days. The mixture is evaporated. To the residue are added 2000 parts of water. The product is extracted with toluene. The extract is dried, filtered and evaporated. The oily residue is distilled in vacuo, yielding 4-(2-dimethylamino-ethoxy)-4-phenyl-piperidine; B.P. 134–137° C. at 0.9 mm. pressure.

A mixture of 6.5 parts of 2-methyl-anilino-ethylbromide hydrobromide, 4.96 parts of 4-(2-dimethylamino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily residue the cyclohexylsulfamate salt is prepared in the usual manner in acetone and 2-propanol, yielding 1-[2-(2-methylanilino)-ethyl]-4-(2-dimethylaminoethoxy) - 4 - phenyl-piperidine di-cyclohexylsulfamate; M.P. 168.5–215° C. (dec.).

EXAMPLE XLIV 450 parts of hydrobromic acid solution 48% are cooled to 0° C. While keeping the temperature below 10° C., there are added portionwise 61.8 parts of 2-(2,5-dichloro-anilino)-ethanol. After the addition is complete, the whole is heated to reflux. Stirring and refluxing is continued for 4 hours while gaseous hydrogen bromide is introduced into the mixture. The reaction mixture is then allowed overnight to come to room temperature. The precipitated product is filtered off, washed with acetone and dried, yielding N-(2-bromo-ethyl)-2,5-dichloro-aniline hydrobromide; M.P. 144–160° C. The mother-liquor is evaporated in vacuo. The residue is boiled in acetone. On cooling, this solution a second fraction is precipitated. It is filtered off and dried, yielding less pure N-(2-bromo-ethyl)-2,5-dichloro-aniline hydrobromide; M.P. 163–166° C.

A mixture of 7.7 parts of N-(2-bromo-ethyl)-2,5-dichloro-aniline hydrobromide, 4.96 parts of 4-(2-dimethyl-amino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily free base the cyclohexylsulfamate salt is prepared in the usual manner in acetone and 2-propanol. After recrystallization of the crude salt from 2-propanol, 1-[2-(2,5-dichloro-anilino)-ethyl]-4-(2 - dimethyl-amino-ethoxy)-4-phenyl-piperidine di-cyclohexylsulfamate is obtained; M.P. 188–189° C.

EXAMPLE XLV

To a stirred and refluxing mixture of 125 parts of 1-(ethoxy-carbonyl)-4-hydroxy-4-phenyl-piperidine in 1200 parts of toluene is added portionwise 34.5 parts of lithium amide (exothermic reaction). The reaction mixture is cooled to 100° C. and then there is added portionwise 136.8 parts of N-(2-chloroethyl)-dibutylamine hydrochloride. After the addition is complete, the whole is stirred and refluxed for 20 hours. The mixture is cooled and decomposed by the addition of water. The organic layer is separated, dried, filtered and evaporated in vacuo. The residue is boiled while stirring together with 208 parts of potassium hydroxide and 1600 parts of 2-propanol for 2 days. The mixture is evaporated in vacuo. To the residue is added 2000 parts of water and the product is extracted with toluene. The extract is dried, filtered and evaporated in vacuo. The oily residue is distilled in vacuo, yielding oily 4-(2-dibutylamino-ethoxy)-4-phenyl-piperidine; B.P. 171–174° C. at 0.5 mm. pressure.

A mixture of 6.5 parts of N-(2-bromo-ethyl)-4-methyl-aniline hydrobromide, 6.25 parts of 4-(2-dibutylamino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. From the oily free base the cyclohexylsulfamate salt is prepared in the usual manner, yielding 1-[2-(4-methyl-anilino)-ethyl]-4-(2-dibutylaminoethoxy)-4-phenyl-piperidine dicyclohexylsulfamate; M.P. 99.5–106° C.

EXAMPLE XLVI

To a stirred and refluxing mixture of 158 parts of 1-(ethoxy - carbonyl) - 4 - hydroxy-4-(3-trifluoromethyl-phenyl)-piperidine in 1200 parts of toluene is added portionwise 34.5 parts of lithiumamide. After the addition is complete, the whole is stirred and refluxed for another hour. Then there is added portionwise 111.6 parts of N-(3-chloro-propyl)-diethylamine hydrochloride and the whole is stirred and refluxed for an additional 20 hours. The reaction mixture is cooled and decomposed by the addition of water. The organic layer is separated, dried, filtered and evaporated, yielding 1-(ethoxy-carbonyl)-4-(3-trifluoromethyl-phenyl)-4-(3-diethylamino - propoxy)-piperidine. This product is stirred and refluxed for 2 days together with 229 parts of potassium hydroxide in 1760 parts of 2-propanol. The mixture is cooled and evaporated in vacuo. To the residue is added 1000 parts of water and the product is extracted with toluene. The extract is dried, filtered and evaporated in vacuo. The oily residue is distilled in vacuo, yielding oily 4-(3-diethylamino-propoxy)-4-(3-trifluoromethyl-phenyl)-piperidine; B.P. 142–144° C. at 0.4 mm. pressure.

A mixture of 6.2 parts of N-(2-bromo-ethyl)-aniline hydrobromide, 7 parts of 4-(3-diethylamino-propoxy)-4-(3-trifluoromethyl-phenyl)-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. From the oily free base, the cyclohexylsulfamate salt is prepared in the usual manner, yielding 1-(2-anilino-ethyl)-4-(3-diethylamino-propoxy)-4-(3-trifluoromethyl-phenyl) - piperidine di-cyclohexylsulfamate; M.P. 150.5–155° C.

EXAMPLE XLVII

A mixture of 4 parts of phenethylbromide, 7 parts of 4 - (3 - diethylamino - propoxy)-4-(3-trifluoromethyl-phenyl)-piperidine, 6.36 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. From the oily free base, the cyclohexylsulfamate salt is prepared in the usual manner, yielding 1 - phenethyl - 4-(3-diethylamino-propoxy)-4-(3-trifluoromethyl-phenyl)-piperidine di - cyclohexylsulfamate; M.P. 182–184° C.

EXAMPLE XLVIII 450 parts of hydrobromic acid 48% are cooled to 0° C. While keeping the temperature between 0° and 10° C., there is added a portionwise 51.5 parts of 2(4-chloro-anilino)-ethanol. After the addition is complete, the whole is heated to reflux. Stirring and refluxing is continued for another 4 hours while gaseous hydrogen bromide is introduced into the mixture. The reaction mixture is then allowed overnight to come to room temperature and evaporated. The oily residue is dissolved in 160 parts of acetone and to this solution is added diisopropyl ether until turbid. On standing at room temperature, the product is precipitated. It is filtered ox and dried, yielding N-(2-bromo - ethyl) - 4 - chloro-aniline hydrobromide; M.P. 149–152° C.

A mixture of 6.9 parts of N-(2-bromo-ethyl)-4-chloroaniline hydrobromide, 5.5 parts of 4-(2-diethylaminoethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily free base, the cyclohexylsulfamate salt is prepared in the usual manner, yielding 1-[2-(4-chloro-anilino) - ethyl] - 4-(2-diethylaminoethoxy)-4-phenyl-piperidine di-cyclohexylsulfamate; M.P. 148–150° C.

EXAMPLE XLIX

A mixture of 6.9 parts of N-(2-bromo-ethyl)-2-chloroaniline hydrobromide, 4.96 parts of 4-(2-dimethylaminoethoxy)-4-phenyl-piperidine, 8.48 parts of sodium carbonate, a few crystals of potassium iodide in 200 parts of 4-methyl-2-pentanone is stirred and refluxed for 2 days. The reaction mixture is cooled, filtered and evaporated. From the oily free base the cyclohexylsulfamate salt is prepared in the usual manner, yielding 1-[2-(2-chloroanilino)-ethyl]-4-(2-dimethylamino-ethoxy) - 4 - phenylpiperidine di-cyclohexylsulfamate; M.P. 184.5–190° C.

EXAMPLE L

A mixture of 6.6 parts of N-[2-(4-fluoro-anilino)]-ethylbromide hydrobromide, 4.96 parts of 4-(2-dimethylamino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily free base the cyclohexylsulfamate salt is prepared in the usual manner, yielding 1-[2-(4-fluoro-anilino)-ethyl] - 4 - (2-dimethylaminoethoxy)-4-phenylpiperidine dicyclohexylsulfamate.

EXAMPLE LI

A mixture of 6.2 parts of N-(2-bromo-ethyl)-anilinehydrobromide, 4.96 parts of 4-(2-dimethylamino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated. From the oily free base the cyclohexylsulfamate salt is prepared in the usual manner. The crude salt is filtered and dried overnight at 100° C. After recrystallization from 2-propanol, 1-(2-anilino-ethyl)-4-(2-dimethylamino-ethoxy)-4-phenyl-piperidine di-cyclohexylsulfamate is obtained; M.P. 156–195° C. (dec.)

EXAMPLE LII

A mixture of 7.7 parts of N-(2-bromo-ethyl)-2,5-dichloroaniline hydrobromide, 5.5 parts of 4-(2-diethylamino-ethoxy)-4-phenyl-piperidine, 8.48 parts of sodium carbonate, a few crystals of potassium iodide in 200 parts of 4-methyl-2-pentanone is stirred and refluxed for 2 days. After cooling, the reaction mixture is filtered and the filtrate is evaporated in vacuo. From the oily free base, the cyclohexylsulfamate salt is prepared in the usual manner, yielding, after recrystallization from acetone, 1-[2-(2,5-dichloro-anilino)-ethyl]-4-(2-diethylamino - ethoxy)-4-phenyl-piperidine di-cyclohexylsulfamate; M.P. 124–126° C.

EXAMPLE LIII

A mixture of 6.9 parts of N-(2-bromo-ethyl)-3-chloroaniline hydrobromide, 4.96 parts of 4-(2-dimethylaminoethoxy)-4-phenyl-piperidine, 8.48 parts of sodium carbonate, a few crystals of potassium iodide in 200 parts of 4-methyl-2-pentanone is stirred and refluxed for 2 days. The reaction mixture is cooled, filtered and the filtrate is evaporated in vacuo. From the residue, the cyclohexylsulfamate salt is prepared in the usual manner, yielding, after recrystallization from 2-propanol, 1-[2-(3-chloroanilino)-ethyl]-4-(2-dimethylamino-ethoxy) - 4 - phenylpiperidine di-cyclohexylsulfamate; M.P. 164–190° C. (dec.).

EXAMPLE LIV

A mixture of 15 parts of 3-chloro-propionanilide, 19.4 parts of 4 - (2 - dibutylaminoethoxy)-4-phenylpiperidine, 15.8 parts of sodium carbonate, a few crystals of potassium iodide in 200 parts of 4-methyl-2-pentanone is stirred and refluxed for 2 days. The reaction mixture is cooled, filtered and the filtrate is evaporated. The residue is dissolved in diisopropylether. This solution is stirred with activated charcoal, filtered and the filtrate is evaporated. From the residue, the dicyclohexylsulfamate salt is prepared in the usual manner, yielding, 3-[4-(2-dibutylaminoethoxy)-4-phenylpiperidino]propionanilide dicyclohexylsulfamate; M.P. 168.5–170° C. The free base, 3-[4 - (2-dibutylaminoethoxy)-4-phenylpiperidino]propionanilide is obtained by conventional treatment of the salt with a suitable alkali, for example, sodium hydroxide.

EXAMPLE LV

To a suspension of 2.3 parts of lithium aluminiumhydride in 80 parts of tetrahydrofuran is added dropwise a solution of 15.5 parts of 3-[4-(2-dibutylaminoethoxy)-4-phenylpiperidino]-propionanilide in 50 parts of tetrahydrofuran and the whole is further stirred and refluxed for 12 hours. The reaction mixture is cooled and treated with successive additions of 2.3 parts of water, 2.3 parts of sodium hydroxide solution (15%) and 9.6 parts of water. The formed precipitate is filtered off, washed on the filter with tetrahydrofuran and the filtrate is evaporated. From the oily free base, the dicyclohexylsulfamate salt is prepared in the usual manner, yielding, after recrystallization of the crude salt from acetone, 1-(3-anilinopropyl)-4-(2-dibutylaminoethoxy)-4-phenylpiperidine di-cyclohexylsulfamate; M.P. 121–132° C.

EXAMPLE LVI

A mixture of 4.65 parts of 1-chloro-2-(2,6-dimethylanilino-carbonyl)-ethane, 6 parts of 4-phenyl-4-(2-diisopropylamino-ethoxy)-piperidine, 6.36 parts of sodium carbonate, a few crystals of potassium iodide in 200 parts of 4-methyl-2-pentanone is stirred and refluxed for 2 days. After cooling, there is added 250 parts of water. The organic layer is separated, dried, filtered and evaporated. The oily residue is dissolved in 80 parts of acetone. To this hot solution is added a warm solution of 3.7 parts of N-cyclohexylsulfamic acid in 80 parts of acetone. The whole is stirred and refluxed for 5 minutes longer. After cooling to room temperature, the precipitated product is filtered off and dried, yielding 4 parts of 1-[2-(2,6-dimethylanilino-carbonyl)-ethyl]-4-(2 - diisopropylaminoethoxy)-4-phenyl-piperidine di-cyclohexylsulfamate; M.P. 182–193° C.

The compounds of this invention are useful as anesthetics. They have been shown to produce conduction anesthesia in laboratory animals similar to the action of such known local anesthetics as procaine, lidocaine, carbocaine and tetracaine. For example, $AD_{60}$ measurements of the rat tail withdrawal reflex show that values ranging from about 0.1 to about 1.0 percent are generally obtained with the subject compounds, as compared to 4.0 percent for procaine, 2.0 percent for lidocaine, 1.8 percent for carbocaine and 0.7 percent for tetracaine. In view of the foregoing pharmacological activity, the subject compounds may be formulated in various pharmaceutical forms conventional in the art for application as local anesthetics.

In testing for anesthetic activity, male Wistar rats weighing about 195–205 grams are kept in metal cages and fasted for 16 hours before the start of the experiment, water being available ad libitum. The rats are then put into individual restraining triangular cages and the lower 5 cm. portion of the tail is marked with a black pencil. Immediately thereafter the pretreatment reaction time of each rat is measured in 0.5 second units with a stopwatch by immersing the lower 5 cm. portion of the tail in water at 55° C. The endpoint is the typical tail withdrawal response and the cut off time is 10 seconds.

Normal reaction time of control animals never exceeds 6 seconds. Each rat is then given two injections in the base of the tail of 0.1 ml. solution each. The solution is either saline (control) or saline containing a calculated amount of the drug under investigation, i.e., 40, 20, 10, 5, etc. mg. per ml.; the pH of each solution is between 6.5 and 7.3. The posttreatment reaction times of the tail withdrawal reflex are measured at different time intervals (5 to 240 minutes) after injection; a positive response is said to have occurred if the reaction time exceeds 10 seconds. Irritation, side effects, seizures and mortality are also determined. With regard to the following table, it should be remarked that the derivatives listed therein are not stated for purposes of limiting this invention thereto, but only to show the useful properties of compounds within the scope of the general formula. The following symbols are used:

$AD_{60}$=concentration of the drug producing anesthesia for a duration of 60 minutes in rats of 200 g.

$SD_{50}$=dose level (in mg./rat) producing side effects in 50% of the animals.

$CD_{50}$=dose level (in mg./rat) producing seizures.

$LD_{50}$=dose level (in mg./rat) producing death.

Among the preferred compounds herein are those 1-(anilinoalkyl)-4-(dialkylamino-alkoxy)-4-phenyl - piperidines having the formula:

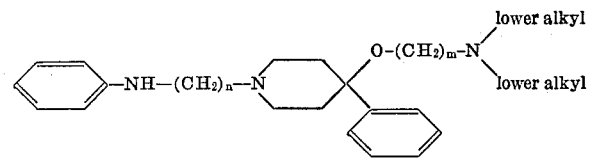

and the therapeutically active acid addition salts thereof, wherein $n$ and $m$ are as previously described.

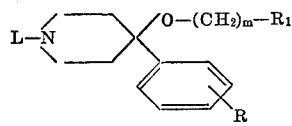

| L | $R_1$ | $m$ | R | $AD_{60}$, percent | $SD_{50}$, mg./rat | $CD_{50}$, mg./rat | $LD_{50}$, mg./rat | Irritation |
|---|---|---|---|---|---|---|---|---|
| —CH₂—CH₂— | —N(C₂H₅)₂ | 2 | 4-Cl | 0.5 | 1.5 | 3.5 | 4.0 | — |
| Same as above | —N | 2 | 4-Cl | 0.4 | 2.2 | 3.2 | 3.2 | — |
| Do | Same as above | 2 | H | 0.5 | 1.0 | 2.5 | 4.0 | — |
| Do | do | 2 | 3-CF₃ | 0.5 | 3.0 | 3.0 | 4.0 | — |
| Do | —N(C₂H₅)₂ | 2 | H | 0.5 | <1.0 | 1.2 | 1.5 | — |
| Do | —N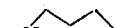 | 2 | 3-CF₃ | ≥0.1 | <4.0 | <4.0 | <4.0 | ± |
| Do | Same as above | 2 | 4-Cl | 0.4 | 3.0 | 3.0 | 3.0 | + |
| Do | —N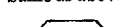 | 3 | H | 1.0 | <4.0 | <4.0 | <4.0 | — |
| Do | —N(C₂H₅)₂ | 3 | 3-CF₃ | 0.5 | 2.0 | 2.0 | 4.0 | ± |
| F—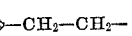—CH₂—CH₂— | —N | 2 | 4-Cl | 0.7 | 2.8 | 2.8 | 2.8 | — |
| Same as above | Same as above | 2 | 3-CF₃ | 0.8 | 2.4 | 3.2 | 3.2 | + |
| CH₃—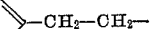—CH₂—CH₂— | do | 2 | 4-Cl | ≥1.0 | <4.0 | <4.0 | <4.0 | + |
| 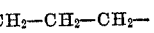—CH₂—CH₂—CH₂— | do | 2 | 4-Cl | 0.5 | 2.5 | 3.0 | 3.5 | + |
| Same as above | —N(i-C₃H₇)₂ | 2 | 4-CH₃ | ~1.0 | <4.0 | <4.0 | <4.0 | — |
| Do | —N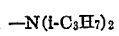 | 3 | H | 0.9 | 3.5 | 5.0 | 6.0 | — |
| —NH—CH₂—CH₂— | —N(C₂H₅)₂ | 2 | H | 0.6 | 3.6 | 6.0 | 6.0 | — |
| 2,6-(CH₃)₂——NH—C(=O)—CH₂— | —N | 3 | 4-Cl | 1.0 | >4.0 | >4.0 | >4.0 | + |
| Same as above | —N | 2 | 3-CF₃ | <1.0 | <4.0 | ~4.0 | ~4.0 | + |
| 2-Cl-6-CH₃——NH—C(=O)—CH₂ | —N(i-C₃H₇)₂ | 2 | H | 0.5 | 5.0 | 5.0 | 5.0 | — |
| 2,6-(CH₃)₂——NH—C(=O)—CH₂—CH₂— | Same as above | 2 | H | ≥1.0 | ≤4.0 | >4.0 | >4.0 | — |

| L | R₁ | m | R | AD₆₀, percent | SD₅₀, mg./rat | CD₅₀, mg./rat | LD₅₀, mg./rat | Irritation |
|---|---|---|---|---|---|---|---|---|
| ⌬—NH—CH₂—CH₂— | —N⌬ | 2 | 4-Cl | ≤1.0 | <4.0 | ~4.0 | ~4.0 | — |
| Same as above | —N⌬ | 2 | 3-CF₃ | ≤0.5 | 3.0 | 3.0 | 3.0 | + |
| Do | —N⌬ | 3 | 4-Cl | 1.2 | 6.0 | 6.0 | 6.0 | — |
| Do | —N(C₂H₅)₂ | 3 | H | 1.5 | 3.0 | 6.0 | 6.0 | — |
| Do | —N⌬ | 3 | H | ≤1.0 | ≤4.0 | >4.0 | >4.0 | — |
| Do | —N(CH₃)₂ | 2 | H | 1.0 | 6.0 | 6.0 | 6.0 | — |
| F—⌬—NH—CH₂—CH₂— | Same as above | 2 | H | 1.0 | >8.0 | >8.0 | >8.0 | — |
| 2,5-(Cl)₂—⌬—NH—CH₂—CH₂— | —N(C₂H₅)₂ | 2 | H | ≥1.0 | ≥4.0 | >4.0 | >4.0 | — |
| ⌬—NHC(O)—(CH₂)₂— | —N(n-C₄H₉)₂ | 2 | H | 0.7 | >4.0 | >4.0 | >4.0 | |
| ⌬—NH—(CH₂)₃— | —N(n-C₄H₉)₂ | 2 | H | ≥1.0 | 3.0 | 3.0 | 3.0 | |
| procaine | | | | 4.0 | 5.0 | 10.0 | 12.0 | — |
| xylocaine | | | | 2.0 | 2.5 | 2.8 | 6.0 | ± |
| carbocaine | | | | 1.8 | 3.2 | 3.6 | 7.2 | — |
| tetracaine | | | | 0.70 | 0.40 | 0.70 | 1.4 | ± |

What is claimed is:

1. A chemical compound selected from the group consisting of a 4-aryl-4-aminoalkoxy-piperidine having the formula:

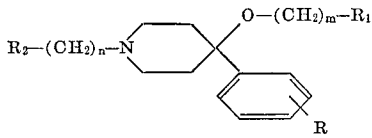

and the therapeutically active acid addition salts thereof, in which $n$ is an integer from 1 to 3; $m$ is an integer from 2 to 3; R is a member selected from the group consisting of hydrogen, lower alkyl, halo and trifluoromethyl; $R_1$ is a member selected from the group consisting of di-(lower alkyl)-amino, piperidino and 1-hexamethylenimino; and $R_2$ is a member selected from the group consisting of Z, Z—NH— and Z—NH—CO—, wherein Z is a member selected from the group consisting of phenyl, mono-substituted phenyl and di-substituted phenyl, the substituent of said substituted phenyl being a member selected from the group consisting of lower alkyl and halo; provided that, when said $R_2$ is Z—NH—, the integer $n$ is 2 or 3.

2. A chemical compound selected from the group consisting of 1-(anilino-alkyl) - 4 - (dialkylamino-alkoxy)-4-phenylpiperidine having the formula:

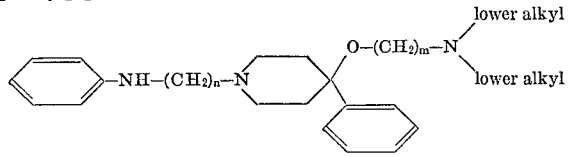

and the therapeutically active acid addition salts thereof, wherein $n$ is an integer from 2 to 3, and $m$ is an integer from 2 to 3.

3. A chemical compound selected from the group consisting of 1-(2-anilino-ethyl)-4-(2-diethylamino-ethoxy)-4-phenylpiperidine and the therapeutically active acid addition salts thereof.

4. The compound of claim 1 which is 1-(2 - anilino-ethyl)-4-(2 - diethylamino - ethoxy)-4-phenyl-piperidine di-cyclohexylsulfamate.

5. A chemical compound selected from the group consisting of 4-aryl-4-aminoalkoxy-piperidine having the formula:

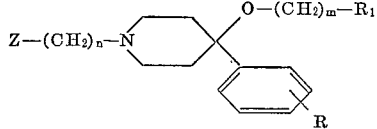

and the therapeutically active acid addition salts thereof, in which $n$ is an integer from 1 to 3; $m$ is an integer from 2 to 3; R is a member selected from the group consisting of hydrogen, lower alkyl, halo and trifluoromethyl; $R_1$ is a member selected from the group consisting of di-(lower alkyl)-amino, piperidino and 1-hexamethylenimino; and Z is a member selected from the group consisting of phenyl, mono-substituted phenyl and di-substituted phenyl, the substituent of said substituted phenyl being a member selected from the group consisting of lower alkyl and halo.

6. A chemical compound selected from the group consisting of a 4-aryl-4-aminoalkoxy-piperidine having the formula:

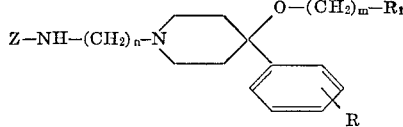

and the therapeutically active acid addition salts thereof, in which $n$ is an integer from 2 to 3; $m$ is an integer from 2 to 3; R is a member selected from the group consisting of hydrogen, lower alkyl, halo and trifluoromethyl; $R_1$ is a member selected from the group consisting of di-(lower alkyl)-amino, piperidino and 1-hexamethylenimino; and Z is a member selected from the group consisting of phenyl, mono-substituted phenyl and di-substituted phenyl, the substituent of said substituted phenyl being a member selected from the group consisting of lower alkyl and halo.

7. A chemical compound selected from the group consisting of a 4-aryl-4-aminoalkoxy-piperidine having the formula:

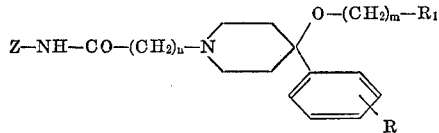

and the therapeutically active acid addition salts thereof, in which $n$ is an integer from 1 to 3; $m$ is an integer from 2 to 3; R is a member selected from the group consisting of hydrogen, lower alkyl, halo and trifluoromethyl; $R_1$ is a member selected from the group consisting of di-(lower alkyl)-amino, piperidino and 1-hexamethylenimino; and Z is a member selected from the group consisting of phenyl, mono-substituted phenyl and di-substituted phenyl, the substituent of said substituted phenyl being a member selected from the group consisting of lower alkyl and halo.

References Cited
UNITED STATES PATENTS

| | | |
|---|---|---|
| 2,498,430 | 2/1950 | Lee. |
| 2,773,870 | 12/1956 | Elpern. |
| 2,912,460 | 11/1959 | Ehrhart et al. |
| 3,275,641 | 9/1966 | Carabateas. |

HENRY R. JILES, Primary Examiner

S. D. WINTERS, Assistant Examiner

U.S. Cl. X.R.

260—294, 294.3, 294.7; 424—267

PO-1050
(5/69)

UNITED STATES PATENT OFFICE
CERTIFICATE OF CORRECTION

Patent No. 3,539,580                Dated November 10, 1970

Inventor(s) Hubert Hermans and Hugo Verhoeven

It is certified that error appears in the above-identified patent and that said Letters Patent are hereby corrected as shown below:

In Column 3, line 33, delete "the scope of". In Column 7, line 59 diisopropylether is misspelled. In Column 12, line 65, add a bracket sign before the numeral 2. In Column 13, line 7, "aniline" should read --anilino--. Same Column, line 16, delete "stirred" and insert --added--. Same Column, line 47, "6.35" should read --6.36--. Same Column, line 74, insert a parenthesis after the bracket sign. Column 19, line 3, "ox" should read --off--.

SIGNED AND
SEALED
JAN 26 1971

(SEAL)
Attest:

Edward M. Fletcher, Jr.
Attesting Officer

WILLIAM E. SCHUYLER, JR.
Commissioner of Patents